United States Patent [19]

Imhof et al.

[11] Patent Number: 4,850,394
[45] Date of Patent: Jul. 25, 1989

[54] MULTI-WAY VALVE

[75] Inventors: Rainer Imhof; Wolfgang Lukasczyk, both of Lohr/Main, Fed. Rep. of Germany

[73] Assignee: Mannesmann Rexroth GmbH, Fed. Rep. of Germany

[21] Appl. No.: 739,211

[22] Filed: May 30, 1985

[30] Foreign Application Priority Data

Jun. 1, 1984 [DE] Fed. Rep. of Germany ....... 3420400

[51] Int. Cl.[4] ............................................. F16K 37/00
[52] U.S. Cl. ..................................... 137/554; 251/63; 251/63.5; 251/282
[58] Field of Search ................. 137/553, 554, 556; 251/63, 63.5, 282; 92/162 R

[56] References Cited

U.S. PATENT DOCUMENTS

| | | | |
|---|---|---|---|
| 2,304,404 | 12/1942 | Flanagan | 251/63 |
| 2,403,427 | 7/1946 | Ludeman | 92/162 R |
| 2,897,836 | 8/1959 | Peters et al. | 137/556 |
| 3,151,624 | 10/1964 | Koutnik | 137/554 |
| 3,331,583 | 7/1967 | Baker | 251/63.5 |
| 3,838,707 | 10/1974 | Wachowitz, Jr. | 251/63.5 |
| 4,027,851 | 6/1977 | Schlotman | 251/282 X |
| 4,195,662 | 4/1980 | Gottel | 137/554 |
| 4,213,480 | 7/1980 | Orum | 137/556 |
| 4,216,795 | 8/1980 | Cobb et al. | 137/554 |
| 4,241,644 | 12/1980 | Schertler | 92/162 R |
| 4,431,159 | 2/1984 | Stubbs | 137/554 |
| 4,460,324 | 7/1984 | Van Appledorn | 251/63.5 |

FOREIGN PATENT DOCUMENTS 3246738 3/1984 Fed. Rep. of Germany.

OTHER PUBLICATIONS

Pages 207 and 208 of 6, Aachener Fluidtechnisches Kolloquim., Mar. 27, 1984.

Primary Examiner—John Rivell
Attorney, Agent, or Firm—Roylance, Abrams, Berdo & Goodman

[57] ABSTRACT

A two-way control valve includes a valve member with a longitudinal bore connecting its opposite ends with each other. A housing receives the movable valve member and has two attachment ports. A control piston is operatively coupled with the valve member. To provide a two-way valve permitting pressure medium to flow in both directions when the valve member is moved from its closed position, the control piston is tightly or fixedly connected with the valve member and is arranged as an annular collar on the periphery of the valve member. The longitudinal bore is free of constrictions.

13 Claims, 1 Drawing Sheet

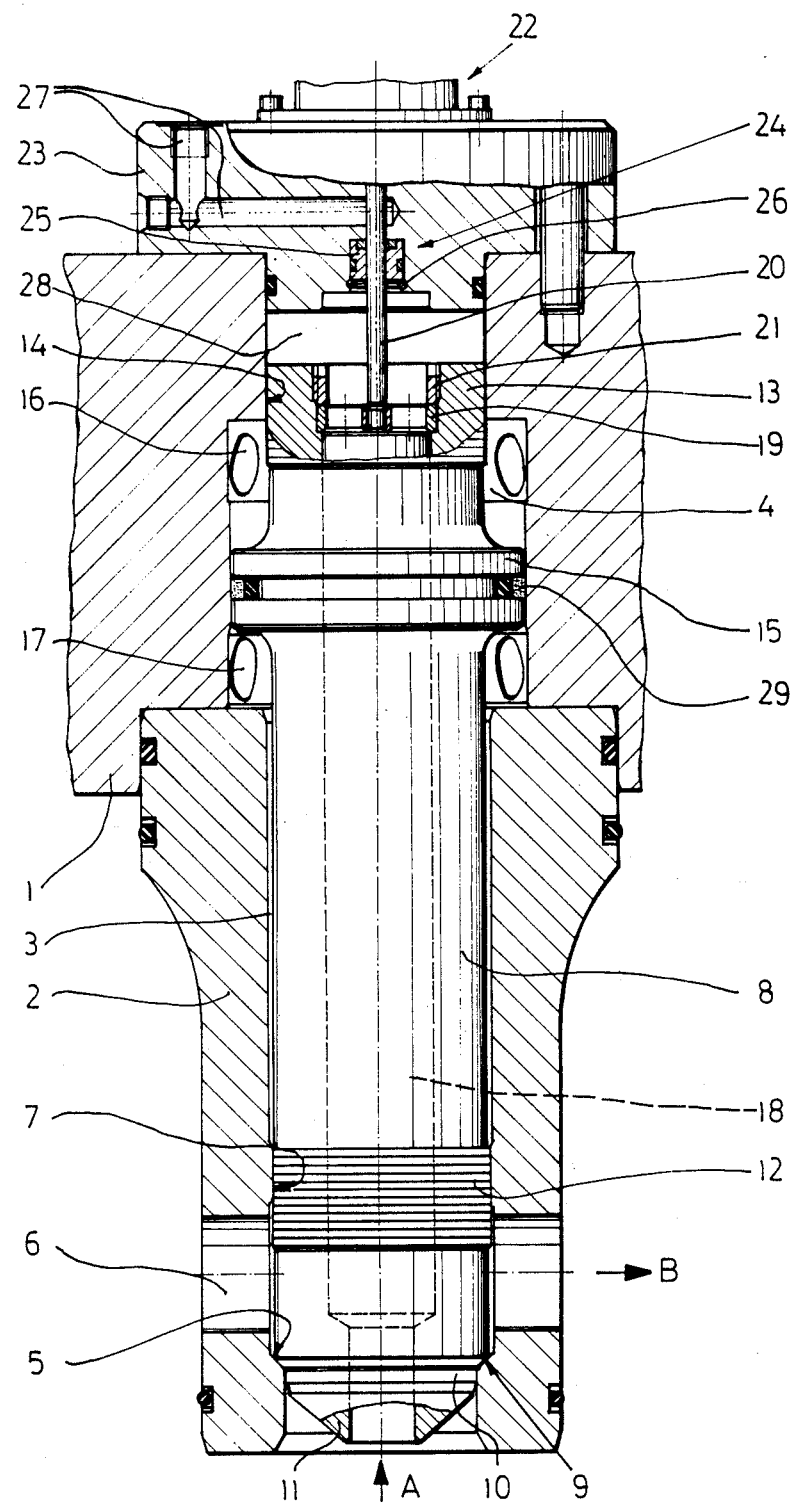

MULTI-WAY VALVE

FIELD OF THE INVENTION

The present invention relates to a two-way or two-direction control valve comprising a valve member with a longitudinal bore connecting its ends, a housing receiving the valve member and having two ports, and a control piston for positioning the valve member in the housing to control flow through the ports.

BACKGROUND OF THE INVENTION

In a conventional two-way or two-direction control valve, the control piston is spaced axially at some distance from the valve member mounted in a special control housing. The control piston has one piston rod on each side. The piston rod adjacent to the valve member has a valve surface which cooperates with a valve seat in the valve member. The control valve of this assembly controls fluid flow through a communication bore between the side of the valve member adjacent to the control piston and the cover surface adjacent to the valve seat of the valve member and offset relative to the other cover surface of the valve member. The lengthwise bore in the valve member is provided with a constriction.

In conventional valves, the opening and closing speeds are different from each other, and are dependent upon the diameter of the constriction and the pressures on the surface adjacent to the valve seat and the engaging annular surface. The known valve opens for flow only in one direction. When the valve member is lifted from its seat, the pressure medium flows past the valve and flows to its offset cover surface. Since the control piston is separated from the valve member, the position of the valve member does not always correspond to the position of the control piston.

SUMMARY OF THE INVENTION

An object of the present invention is to provide a two-way valve which can permit flow in both directions when the valve member is moved from its closed position by pressure medium.

Another object of the present invention is to provide a two-way valve wherein the position of the valve member always corresponds to the position of the control piston and wherein the problems of the conventional valves are avoided.

The foregoing objects are obtained by a two-way valve comprising a housing with first and second attachment ports, a valve member mounted in the housing to control fluid communication between the ports and a control piston fixedly connected to the valve member for controlling valve member movement. The valve member has a longitudinal bore connecting its opposite longitudinal ends in fluid communication, which bore is free of constrictions. The control piston is a generally annular collar.

By forming the valve in this manner, the valve member is controlled directly by the control piston and is held in any desired position by the control piston. The positions of the valve member and the control piston coincide at any time point. Thus, the valve according to the present invention can allow the pressure medium to flow in both directions. The switching times for opening and closing the valve are identical.

The valve member can be controlled with a motion sensor. The motion sensor can be fixedly connected to the control piston through the valve member.

Best pressure balance is attained by a valve seat in the housing between the ports, by the ends of the valve member being of essentially identical size in transverse cross section, and by the valve surface on the valve member, which mates with the valve seat, being divided into separate parts on opposite sides of the valve seat. A force tending to close the valve is produced when the pressure on one of the valve surface parts is less the pressure than on the other valve surface part.

Less pressure medium leaks out of the valve when guide collars are mounted on opposite sides of the control piston and the clearance between each guide collar and the housing is less than the clearance between the housing and the control piston. This minimizes leakage without inhibiting the play of the control piston.

A tie rod can connect the valve member to a movable portion of a motion sensor, and can pass through a stationary packing between the valve member and sensor. This facilitates replacement of the motion pickup or sensor, without loss of pressure medium.

Other objects, advantages and salient features of the present invention will become apparent from the following detailed description, which, taken in conjunction with the annexed drawings, discloses preferred embodiments of the present invention.

BRIEF DESCRIPTION OF THE DRAWING

The sole drawing FIGURE, which forms a part of this disclosure, is a side elevational view in section of a two-way valve according to the present invention, in which only a part of the central portion is in section.

DETAILED DESCRIPTION OF PREFERRED EMBODIMENTS

Referring to the drawing, a valve housing comprises a cover 1 and a casing 2. The casing is inserted and tightly fitted in cover 1. The cover can also be constructed in another housing. Casing 2 has a multi-stage axial bore 3 arranged coaxially relative to a multi-stage axial bore 4 in cover 1. A conical valve seat 5 is found in axial bore 3 at its end away from cover 1. Valve seat 5 is adjacent a transverse bore 6 in casing 2 forming one of the housing ports and located after a cylindrical guide surface 7 relative to a direction toward cover 1.

A piston-like valve member 8 can move in axial bores 3 and 4, and has a frustoconical valve surface 9 which cooperates with valve seat 5. A cylindrical part 10, cooperating with the inside wall of axial bore 3, extends from valve surface 9 on the end of the valve surface away from cover 1. The cylindrical part is followed by another conical part 11, having a different taper angle. When the valve member is lifted from valve seat 5, cylindrical part 10 and the adjacent section of conical part 11 delay the opening of the valve.

Valve member 8 is essentially cylindrical from valve seat 9 up, i.e., in the direction of cover 1, and has a guide collar 12 in the area of the cylindrical guide surface 7. Guide collar 12 is wider than this guide surface. A guide collar 13 of the same transverse diameter is found on the end of valve member 8 away from valve seat 9. Guide collar 13 cooperates with a cylindrical guide surface 14 in a constricted area in chamber 28 in axial bore 4 in cover 1.

An annular or collar-like control piston 15 is provided on valve member 8 in the area of guide collar 13, and is unitarily formed with and fixedly attached to valve member 8. The transverse diameter of control piston 15 is greater than the transverse diameters of guide collars 12 and 13. Guide collars 13 and 12 are mounted in cover 1 and casing 2, respectively, so that only a narrow clearance is present between one of these guide collars 12 and 13 and the respective cover 1 or casing 2. The comparatively wider clearance between control piston 15 and cover 1 is packed or sealed by a packing or sealing ring 29. Control bores 16 and 17 are provided in cover 1 on either side of control piston 15 and open in a larger diameter portion of axial bore 4.

Valve member 8 has an axial, longitudinal bore 18 extending completely through it and connecting the opposite longitudinal ends of valve member 8 with each other. Each longitudinal end has the same transverse, cross-sectional diameter and are essentially identical in size. An annular holder 19, into which is threaded a tie rod 20, is inserted in the end of valve member 8 located in cover 1. Holding member 19 is held by a threaded ring 21. Pressure medium can flow in through openings in holding member 19.

Tie rod 20 extends to an electronic motion pickup or sensor 22 for indicating the position of valve member 8 at any time. Axial bore 4 in cover 2 is closed by a cover-like cap member 23. Motion pickup 22 is mounted on cap member 23. The side of cap member 23 facing away from motion sensor 22 is engaged in axial bore 4 in cover 1. Tie rod 20 passes through cap member 23. A stationary packing or sealing device 24 is mounted in cap member 23 adjacent to valve member 8 where a packing or seal member 25 is held in place by a flexible holding ring 26. The clearances between packing member 25 and cap member 23 and tie rod 20 are packed or sealed by packing or sealing rings. A leak hole 27 is provided between packing device 24 and motion pickup 22.

Control bores 16 and 17 are coupled to a switch valve (not shown), particularly a servovalve, with a shut-off valve connected behind it. An additional directional control valve can be connected in the fluid circuit as a safety valve, parallel to the aforementioned valves, and can be connected to or separated from a pressure medium source by means of the switch valve.

If pressure medium is fed from the switch valve to control bore 16 and is discharged from control bore 17, then valve member 8 holds its valve surface 9 on valve seat 5 of casing 2. The valve is closed so that no pressure medium flowing in the direction of arrow A can be discharged from transverse bore 6 in the direction of arrow B. The pressure of the pressure medium, flowing in the direction of arrow A and passing through longitudinal bore 18 in valve member 8 is applied on the longitudinal end of valve member 8 in chamber 28. If the pressure in transverse bore 6 in casing 2 is lower than the pressure at conical part 11 of valve member 8 and at the opposite valve member end surface in chamber 28, then the force on valve member 8 causing it to close is greater than the force causing it to open, with no pressure applied on control piston 15.

The switch valve and the shutt-off valve are preferably configured as directional control valves. The servovalve forming the switch valve can be a four port-three way proportional valve. The shut-off valve and the additional control valve can each have four ports, two flow paths and two positions.

Valve member 8 is lifted from valve seat 5 of casing 2 when control bore 17 is connected with the control pressure medium source and control bore 16 is connected with the supply container through the switch valve. When valve member 8 is lifted, pressure medium flowing in the direction of arrow A enters casing 2 and is discharged from casing 2 through transverse bore 6 in the direction of arrow B.

Since both ends of valve member 8 are subjected to the same pressure through longitudinal bore 18, this valve member is pressure-balanced. The ratio of the transverse diameters of control piston 15 and guide collars 12 and 13 can be kept quite small. Only a small volume of pressure medium is needed for the control.

The position of valve member 8 and the opening or throughput section through the two-way valve is determined by the switch valve, in response to an electrical signal from the outside. This signal is obtained from the difference of a predetermined theoretical value and the actual value determined from motion pickup 22.

Motion pickup 22 can be separated from tie rod 20 by packing device 24, even if pressure medium is present in pressure chamber 28. The switch valve and the safety valve are advantageously mounted on cover 1 to provide a compact structure.

Instead of a seat valve, a slide valve can be used with a control piston or a sliding piston. Valve seat 5 and valve surface 9 are then omitted. Guide surface 7 and guide collar 12 would then extend to the other side of transverse bore 6 so that it can be closed by collar 12. The valve is opened by upward movement of valve member 8.

While various embodiments have been chosen to illustrate the invention, it will be understood by those skilled in the art that various changes and modifications can be made therein without departing from the scope of the invention as defined in the appended claims.

What is claimed is:

1. A multi-way valve, comprising:
    a housing with first and second attachment ports;
    a valve member movably mounted in said housing to control fluid communication between said ports, said valve member having first and second longitudinal ends and a longitudinal bore connecting said ends in fluid communication, said first and second ends of said valve member being of essentially equal size in transverse cross section, said longitudinal bore being free of constrictions;
    a control piston fixedly connected to said valve member for controlling movement of said valve member, said control piston being a generally annular collar;
    a control pressure means for selectively applying and relieving pressure on each side of said control piston;
    an electronic motion sensor fixedly connected to said control piston through said valve member;
    whereby pressure fluid can flow substantially freely through said longitudinal bore between said first and second ends applying equal pressure on said first and second ends, and said valve member can be rapidly adjusted in a fluid pressure dependent manner.

2. A multi-way valve according to claim 1 wherein said housing comprises a valve seat, said first and second ports being located on opposite sides of said valve seat; and
    said valve member comprises a valve surface on said first end which mates with said valve seat, said valve surface being divided into first and second parts on opposite sides of said valve seat.

3. A multi-way valve according to claim 2 wherein first and second guide collars are mounted on opposite sides of said control piston, clearance between each of said guide collars and said housing being less than clearance between said housing and said control piston.

4. A multi-way valve according to claim 3 wherein a tie rod connects said valve member to a movable portion of said electronic motion sensor, and passes through a stationary packing between said valve member and said motion sensor.

5. A multi-way valve according to claim 1 wherein first and second guide collars are mounted on opposite sides of said control piston, clearance between each of said guide collars and said housing being less than clearance between said housing and said control piston.

6. A multi-way valve according to claim 5 wherein a tie rod connects said valve member to a movable portion of said electronic motion sensor, and passes through a stationary packing between said valve member and said motion sensor.

7. A multi-way valve according to claim 1 wherein said longitudinal bore is free of outlets between said first and second ends.

8. A multi-way valve according to claim 1 wherein said valve member and said piston are unitarily formed as one piece.

9. A multi-way valve, comprising:
a housing with first and second attachment ports;
a valve member movably mounted in said housing to control fluid communication between said ports, said valve member having first and second longitudinal ends and a longitudinal bore connecting said ends in fluid communication, said first and second ends of said valve member being of essentially equal size in transverse cross section, said longitudinal bore being free of constrictions;
a control piston fixedly connected to said valve member for controlling movement of said valve member, said control piston being a generally annular collar;
a control pressure means for selectively applying and relieving pressure on each side of said control piston; and
first and second guide collars mounted on opposite sides of said control piston, clearance between each of said guide collars and said housing being less than clearance between said housing and said control piston;
whereby pressure fluid can flow substantially freely through said longitudinal bore between said first and second ends applying equal pressure on said first and second ends, and said valve member can be rapidly adjusted in a fluid pressure dependent manner.

10. A multi-way valve according to claim 9 wherein said housing comprises a valve seat, said first and second ports being located on opposite sides of said valve seat; and
said valve member comprises a valve surface on said first end which mates with said valve seat, said valve surface being divided into first and second parts on opposite sides of said valve seat.

11. A multi-way valve according to claim 9 wherein a tie rod connects said valve member to a movable portion of an electronic motion sensor, and passes through a stationary packing between said valve member and said motion sensor.

12. A multi-way valve according to claim 9 wherein said longitudinal bore is free of outlets between said first and second ends.

13. A multi-way valve according to claim 9 wherein said valve member and said piston are unitarily formed as one piece.

* * * * *